United States Patent [19]
Muller, Jr.

[11] 4,335,897
[45] Jun. 22, 1982

[54] GARDEN CART WITH REMOVABLE CONTAINER

[76] Inventor: Henry J. Muller, Jr., 1730 Glen Oaks Dr., Santa Barbara, Calif. 93108

[21] Appl. No.: 185,506

[22] Filed: Sep. 9, 1980

Related U.S. Application Data

[63] Continuation-in-part of Ser. No. 26,421, Mar. 2, 1979, abandoned.

[51] Int. Cl.³ .............................................. B62B 1/20
[52] U.S. Cl. .............................. 280/47.18; 280/47.26
[58] Field of Search ............ 280/653, 654, 659, 47.18, 280/47.26, 47.31

[56] References Cited

U.S. PATENT DOCUMENTS 3,743,312  7/1973  Gibbons .......................... 280/47.18

*Primary Examiner*—Robert R. Song
*Assistant Examiner*—Michael Mar

[57] ABSTRACT

An all-purpose garden cart with a removable container of rigid polyethylene which nests in a tubular aluminum carriage and is fastened securely therein by a unique locking device which allows the container to be quickly and easily snapped in or out of the carriage. The removable container permits quick and complete unloading either by tipping the cart forward and inverting the container or by lifting the container out of the carriage and dumping the contents directly into a truck bed or trash receptacle. The use of a polyethylene container fabricated without bolt holes or other openings and firmly supported by an independent cradle type carriage results in a light, sturdy, hard-surfaced, leak-proof and corrosion resistant garden cart container which has a number of unique and significant advantages. Large diameter, spoked wheels with broad rubber tires provide good trafficability and flotation.

1 Claim, 4 Drawing Figures

GARDEN CART WITH REMOVABLE CONTAINER

REFERENCE TO OTHER APPLICATIONS

This application is a continuation in part of application Ser. No. 026,421, filed Mar. 2, 1979, now abandoned.

SUMMARY OF THE INVENTION

This invention relates to a new concept of an all-purpose garden cart utilizing a light but sturdy carriage and a removable, rigid container.

It is the principal object of this invention to provide a durable, single vehicle which will meet all of the requirements of a garden cart used in a sizeable yard or garden. These requirements might reasonably include: (1) The loading and transporting of leaves, clippings and other light-weight garden trash to a disposal area where it can be easily and quickly unloaded either at ground level or into an elevated receptacle such as a truck bed, mulch bin or trash barrel; (2) The lifting and/or transporting of heavy objects such as bags of fertilizer or sharp-cornered ones such as concrete blocks or bricks; (3) The mixing, transporting and dumping of liquid or non-cohesive loads such as mortar, chemical solutions, sand or soil mixes.

In order to meet the above requirements, a garden cart must be light but sturdy and equipped with large wheels and broad tires to have good trafficability and flotation over uneven or soft ground. The container must be spacious, light in weight, rigid, hard-surfaced, leak-proof, chemically inert and resistant to the effects of weather, brine or dilute acids. It must not rust when the surface is scratched or rot out from dampness. The design of the cart must permit it to be tipped forward to a lip-to-ground position so that leaves and other garden trash may be raked directly into the container, or to dump liquids or to be used like a hand truck to lift heavy garden loads. Further, the container must be quickly and easily removable to permit one-step, complete unloading of leaves and clippings into a trash receptacle or truck bed. The cart which will be described below meets all of the above requirements through the use of a heavy guage, tubular aluminum frame, doubled at key stress points and supported by a hardened steel axle and heavy duty, spoked, 20 inch wheels with broad rubber tires. A large, rigid, high density polyethylene container can be quickly and easily engaged in or disengaged from the carriage.

The principal object of my invention and other useful features will be better understood when the succeeding description and claims are read with reference to the drawings accompanying this specification.

It is to be understood that the use of the term "pan" hereinafter refers to the container.

Figure 1:
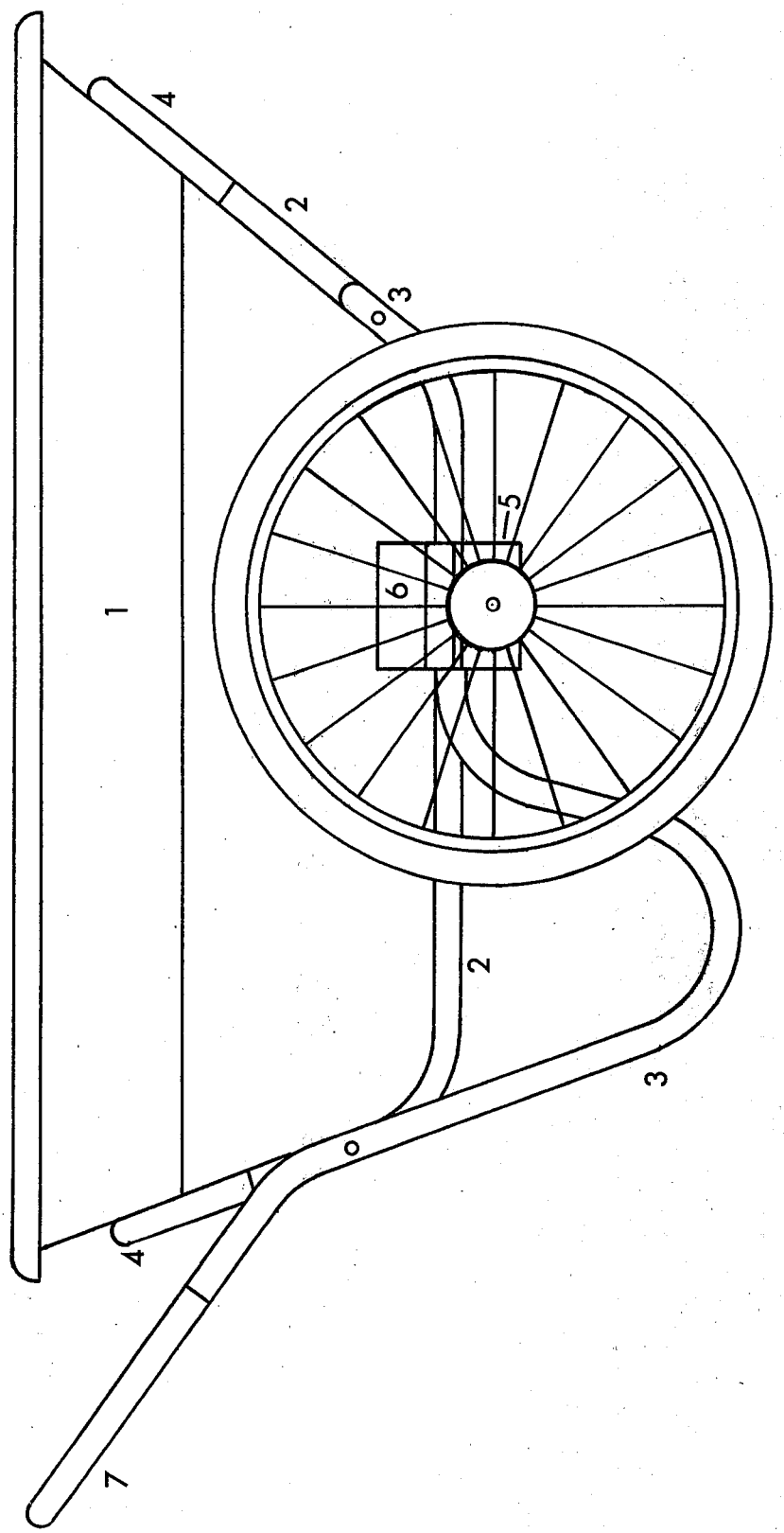
FIG. 1 is a side elevation of my garden cart, with the container mounted in the carriage, illustrating the design and configuration of the assembled cart.
Figure 2:
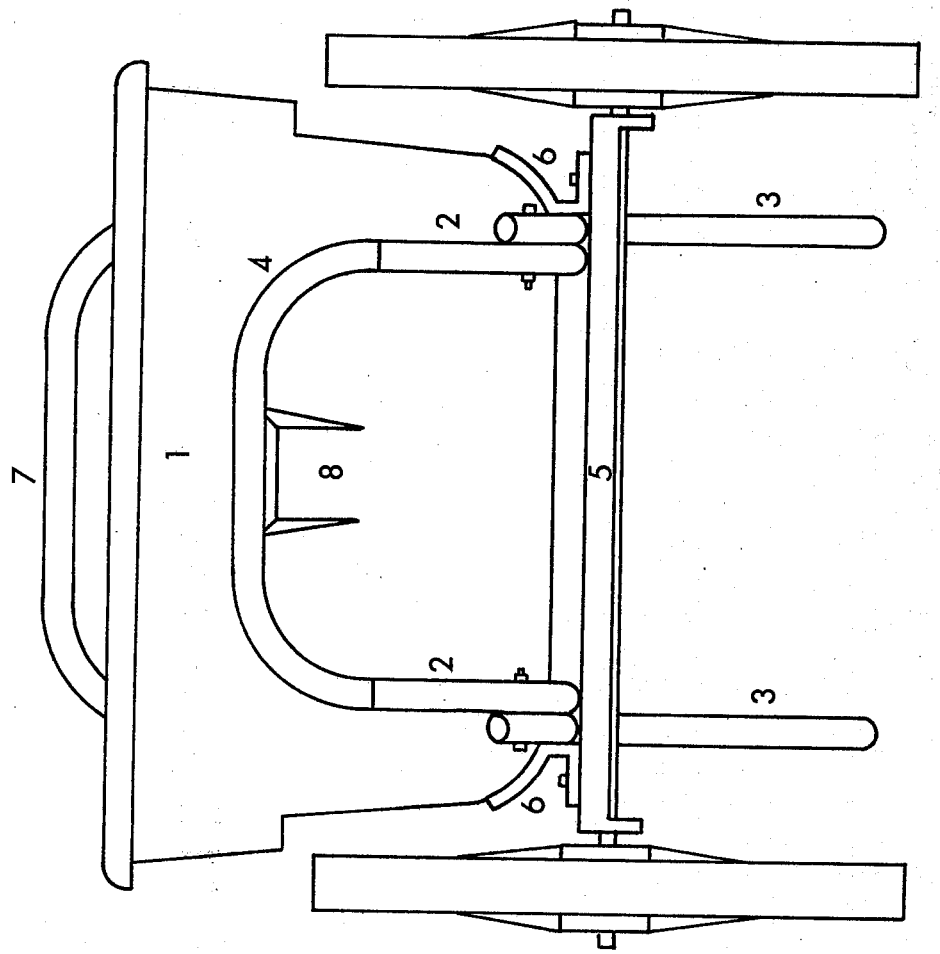
FIG. 2 is a front elevation of the complete cart further illustrating its design and configuration and showing the manner in which the container is secured to the cart as well as prevented from lateral movement.

Referring to FIGS. 1 and 2 there is illustrated a cart with a tubular aluminum carriage consisting of two cradles 2 and two stands 3 with each stand bolted to a cradle horizontally and all four pieces bolted vertically to a steel cross brace 5 which serves to space the cradles 2 and stands 3, hold them parallel to each other and provide rigidity to the entire carriage. Front and rear end braces 4 telescope over the ends of the cradles 2 to add further rigidity to the carriage and provide support for the front and rear faces of the container 1.

The steel cross brace 5 has a longitudinal flange along its leading edge for structural strength. There are also two lateral flanges which serve to attach the steel axle to the carriage. The flanges are welded where they join at the corners.

Twenty inch diameter, spoked wheels with ball bearings and broad rubber tires are secured to the axle with cotter pins. The wheels are prevented from moving inward by the side flanges of the cross brace 5. Two extruded aluminum side stays 6 are bolted to the cross brace 5 to prevent lateral movement of the pan 1 and thus keep it from rubbing against the wheels.

A tubular aluminum handle 7 telescopes over the rear end of the stands 3 and is held in place by metal screws on the undersides. The handle 7 not only serves the obvious purpose of a handle but also provides additional rigidity to the frame as well as hold the lower loops of the stands 3 parallel to each other and perpendicular to the horizontal plane of the cart.

The forward extensions of the stands 3 provide extra strength along the front bends in the cradles 2 where the stress is greatest when the cart is rotated upward from the tipped-forward to the upright position. Force applied to the handle 7 is transmitted directly to the frame and axle without stressing the polyethylene pan 1.

Tubular aluminum sections of the carriage are anodized to resist corrosion. The steel cross brace 5 is cadmium plated. The leading ends of the stands 3 are capped with plastic end closures.

Figure 3:
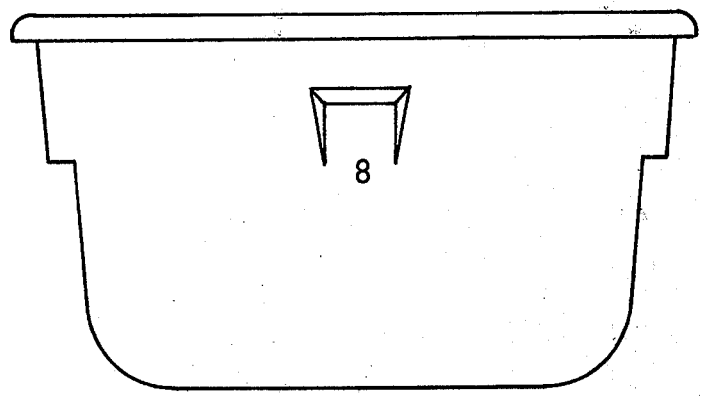
FIG. 3 is a front elevation of the container illustrating its configuration and showing the shape and location of one of the latches which lock the container into the carriage.
Figure 4:
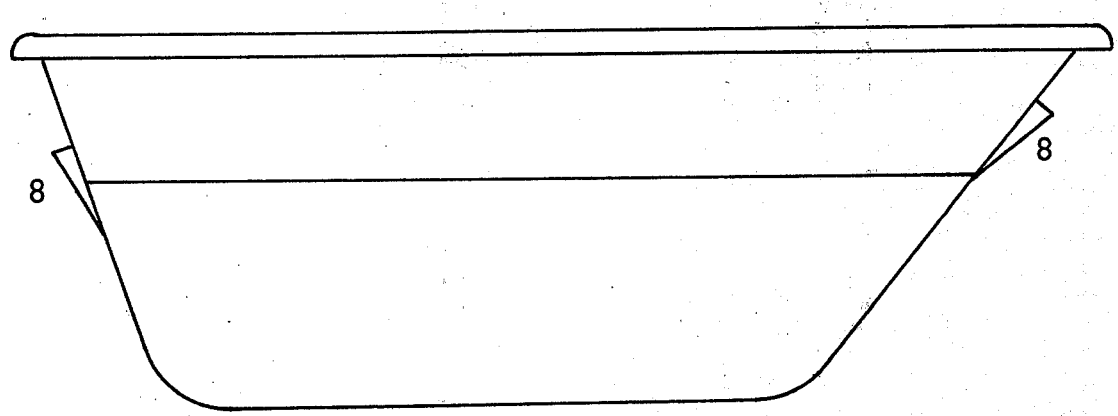
FIG. 4 is a side elevation of the container illustrating its configuration and showing the shape and location of the latches on both front and rear faces.

FIGS. 3 and 4 illustrate a vacuum formed polyethylene pan 1 and show the wedge shaped protrusions molded into its front and rear faces which serve as the latches 8 to secure the pan 1 in the carriage. The natural resiliency of the sloped polyethylene surfaces allow the latches 8 to press inward and then snap back under the end braces 5 when the pan 1 is pushed downward into the carriage. The latches 8 can be disengaged by pushing in on either the front or rear face of the pan 1 and lifting it upward.

The pan 1 has a one inch diameter lip around the opening and a one inch step-back on either side for increased rigidity. All faces of the pan are downwardly tapered to facilitate removal from the mold. The slope of the front face is designed to be nearly parallel to the ground when the cart is tipped forward but with a slight downward slope in order to dump completely liquid loads or to drain the pan after washing.

The pan is 15 inches deep; the opening is 26 by 43 inches. All radii are 3½ inches so that there are no sharp corners which would impair its usefulness as a tub for mixing mortar.

The pan 1 is vacuum formed from sheets of 5/16 inch, high density polyethylene. An ultra-violet ray inhibitor has been added to reduce sun damage.

The polyethylene pan 1, used in lieu of the conventional sheet metal on ply board pans, weighs only 12 pounds. This, combined with the aluminum carriage makes an extremely light cart relative to its spaciousness (7.3 cu. ft.) and load carrying capacity (320 pounds). The entire cart weighs 44 pounds with semi-pneumatic tires and only 36 pounds when equipped with penumatic tires.

The operation of the cart is now described: The cart is designed primarily for carrying all types of objects and materials normal to a garden area. It can be loaded in the upright position or tipped forward, lip to ground, so that light items such as leaves or trimmings can be raked directly into the pan. It can also be used to lift heavier garden loads such as sacks of fertilizer by sliding them onto the front face of the pan and then elevating the load by using the handle as a lever and the axle as a fulcrum.

The cart can be unloaded by tipping it forward and releasing and inverting the pan. When the contents are to be dumped at an elevation higher than the cart, such as a truck bed or trash receptacle, the pan can be quickly released and lifted out of the carriage.

The large, rigid, leak proof pan, when detached from the carriage, can serve a variety of useful purposes around the home and garden. The detached pan with contents can also be left at the curb for trask pick-up without risking loss of the cart.

Because it is highly resistant to corrosion by either dilute acids or salt spray, the cart is especially well suited as a utility cart as stables or marinas.

What is claimed as new is:

1. A multi-purpose garden cart comprising a tubular aluminum carriage having a cradle, front and rear U-shaped tubular end braces secured to the ends of said cradle, a pair of stands for supporting said cart, and a handle secured to said stands, said carriage mounting a transverse axle with large diameter wheels on opposite ends and supporting, by detachable engagement, a rigid yet resilient polyethylene container formed from a single sheet without seams or apertures and having a molded, outward protrusion to serve as a latch on both its front and rear faces; said container having the means for being engaged into said carriage by pressing it downwardly causing the resilient front end rear faces to depress inwardly until the latches, having passed over the front end rear tubular and braces of said carriage, snap back outwardly engaging beneath them; while the bottom of said container rests on said cradle and means for of instantly detaching it from said carriage by pressing inwardly on either its front or rear face releasing said latches and lifting the container up and out of the carriage thus permitting its contents to be quickly and completely dumped directly into a truck bed or trash receptical or heaped on top of a mulch or leaf pile; and the means, when secured in said carriage, of being adapted tilted forward and balanced in a lip-to-ground position permitting leaves and other garden waste to be raked directly into it; and means for lifting heavier garden loads placed on its front face while in the tilt-forward position by rotating the carriage backwardly causing the load to slide down its slippery, steeply sloping front face; and the additional capability, because of its right, sturdy and leakproof characteristics, of being utilized to mix, carry and dump liquid loads and, when detached from the carriage, of serving other uses around the home and garden such as a vat for mixing mortar, a tub for washing dogs or a wading pool for children.

* * * * *